United States Patent
Bai et al.

(10) Patent No.: US 9,834,674 B2
(45) Date of Patent: Dec. 5, 2017

(54) EASILY-PLATED PC/ABS ALLOY AND ITS PREPARATION METHOD

(71) Applicant: SHANGHAI KUMHOSUNNY PLASTICS CO., LTD, Shanghai (CN)

(72) Inventors: Liangui Bai, Shanghai (CN); Minqi Xin, Shanghai (CN); Minghua Luo, Shanghai (CN); Qiang Li, Shanghai (CN)

(73) Assignee: SHANGHAI KUMHOSUNNY PLASTICS CO., LTD, Shanghai (CN)

( * ) Notice: Subject to any disclaimer, the term of this patent is extended or adjusted under 35 U.S.C. 154(b) by 50 days.

(21) Appl. No.: 15/034,530

(22) PCT Filed: Nov. 11, 2013

(86) PCT No.: PCT/CN2013/086827
§ 371 (c)(1),
(2) Date: May 4, 2016

(87) PCT Pub. No.: WO2015/066910
PCT Pub. Date: May 14, 2015

(65) Prior Publication Data
US 2016/0304713 A1    Oct. 20, 2016

(30) Foreign Application Priority Data

Nov. 5, 2013 (CN) .......................... 2013 1 0542230

(51) Int. Cl.
| | |
|---|---|
| C08L 55/02 | (2006.01) |
| C08L 69/00 | (2006.01) |
| B29C 47/92 | (2006.01) |
| C08J 3/00 | (2006.01) |
| C08J 3/12 | (2006.01) |
| C08J 3/20 | (2006.01) |
| B29C 47/00 | (2006.01) |
| B29K 55/02 | (2006.01) |
| B29K 69/00 | (2006.01) |

(52) U.S. Cl.
CPC .............. *C08L 69/00* (2013.01); *B29C 47/92* (2013.01); *C08J 3/005* (2013.01); *C08J 3/12* (2013.01); *C08J 3/20* (2013.01); *C08L 55/02* (2013.01); *B29C 47/0004* (2013.01); *B29K 2055/02* (2013.01); *B29K 2069/00* (2013.01); *C08J 2355/02* (2013.01); *C08J 2369/00* (2013.01); *C08J 2455/02* (2013.01); *C08J 2469/00* (2013.01); *C08J 2471/02* (2013.01); *C08L 2201/08* (2013.01); *C08L 2205/03* (2013.01)

(58) Field of Classification Search
CPC .................................. C08L 55/02; C08L 69/00
USPC ................................................ 524/505, 508
See application file for complete search history.

(56) References Cited

PUBLICATIONS

CN 102516735 Machine translation. Original document dated (2012).*

* cited by examiner

Primary Examiner — Edward Cain

(57) ABSTRACT

The present invention relates to an easily-plated PC/ABS alloy and its preparation method. The PC/ABS alloy includes following components: 30-70 parts by weight (pbw) of PC resin, 15-65 pbw of ABS resin, 5-10 pbw of PEO resin, 0.1-1 pbw of antioxidant, and 0.1-1 pbw of lubricant. For preparation, blending the PC resin, ABS resin, PEO resin, antioxidant and lubricant in a mixer; and putting a mixture in a twin-screw extruder for granulation, thus producing easily-plated PC/ABS alloy. The method is simple and practicable. PEO resin makes PC/ABS surface have the property of hydrophilicity, which makes the etching solution easier to wet the surface when under etching, so that the etching becomes much easier. The binding force of hydrophilic group on the surface of PEO to the metal is strong. The binding force of PC/ABS alloy material is improved due to the combination between the chemical bond and physical force.

10 Claims, No Drawings

EASILY-PLATED PC/ABS ALLOY AND ITS PREPARATION METHOD

CROSS REFERENCE OF RELATED APPLICATION

This is a U.S. National Stage under 35 U.S.C 371 of the International Application PCT/CN2013/086827, filed Nov. 11, 2013, which claims priority under 35 U.S.C. 119(a-d) to CN 201310542230.6, filed Nov. 5, 2013.

BACKGROUND OF THE PRESENT INVENTION

Field of Invention

The present invention belongs to the field of polymer blending and polymer processing, and specifically it relates to the preparation of an easily-plated PC/ABS alloy.

Description of Related Arts

The PC/ABS alloy, due to its excellent heat resistance, toughness, fatigue resistance and plating property, is widely used in automotive interiors and exteriors, such as interior and exterior door handles, nameplates, wheel housing, grating and decoration strips, etc. In electroplating technology, etching process is closely related to material property.

For PC/ABS material, because PC cannot be plated, the electroplating property of PC/ABS is not as well as ABS. With the same etching temperature, the etching time of PC/ABS is longer than electroplating ABS, which affects the electroplating efficiency of PC/ABS. After etching, the material surface is evenly distributed with pores, through which chemical Ni combines with the material, forming the coating. This combination is achieved through physical method, so the binding force is low.

In conventional electroplating process, etching solution is mainly composed of concentrated sulfuric acid and chromic acid, with strong oxidizing property, which converts the material from hydrophobicity to hydrophilicity through oxidizing material surface, thus lowering down the contact angle on the surface. This process makes etching solution spread on surface, so that it can uniformly etch rubber B distributed on the surface. This process can improve the hydrophilicity of material surface with plating solution.

PEO, as a kind of hydrophilous resin, is widely used in the field of medicine and cosmetic. The strong hydrophilicity of PEO may increase the hygroscopicity and moisture content of the material, which may degrade PC material as PC material is highly sensitive to moisture. That is the reason why PEO is rarely used in the field of modified PC.

SUMMARY OF THE PRESENT INVENTION

The present invention aims to provide an easily-plated PC/ABS alloy. This easily-plated PC/ABS alloy features the property of easy-plating and strong adhesion. Another purpose of the present invention is to provide a method for preparing the alloy material.

The present invention is realized by the following technical solution. This easily-plated PC/ABS alloy comprises following components in pbw:

| | |
|---|---|
| PC resin | 30-60, |
| ABS resin | 15-55, |
| PEO resin | 5-10, |
| antioxidant | 0.1-1, |
| lubricant | 0.1-1. |

The optimal content range of the PEO resin is 5-10; if lower than 5, the influence on contact angle of PC/ABS alloy surface is small and easy plating is not available; if higher than 10, the strong hygroscopicity will greatly influence the material's physical property, which will lower down the impact performance.

Preferably, the relative molecular mass of said PC resin is 17000-30000 g/mol, and the glass transition temperature is 140-150° C.

Preferably, the PC resin is synthesized through phosgenation. The preference reason is that PC resin synthesized through phosgenation has excellent thermostability.

Preferably, the ABS resin is graft copolymer composed of acrylonitrile-butadiene-styrene. The relative molecular mass of said ABS resin is 100000-180000 g/mol, of which the weight percentage of butadiene is 30-55%, the weight percentage of acrylonitrile is 15-32%, and the weight percentage of styrene is 30-60%. More preferably, the relative molecular mass of said ABS resin is 150000-180000 g/mol, of which the weight percentage of butadiene is 45-55%, the weight percentage of acrylonitrile is 15-32%, and the weight percentage of styrene is 30-60%. Preferable ABS, with high content of butadiene, is able to greatly improve the impact performance of PC/ABS alloy herein.

Preferably, the relative molecular mass of said PEO resin is 10000-20000, which is able to obviously lower down the contact angle of PC/ABS, thus making plating of PC/ABS alloy easy.

Preferably, the antioxidant is selected from a group consisting of triethylene glycol bis [β-(3-tert-butyl-4-hytroxy-5-methylpheny) propionate], pentaerythrite tetra [β(3,5-ditert-butyl-4-hydroxyphenyl)-propionate], tris (2,4-ditertbutylphenyl) phosphite, and distearyl pentaerythritol diphosphite.

Preferably, the lubricant is selected from a group consisting of silylated polymer, solid paraffin, liquid paraffin, fatty acid salt, calcium stearate fatty acid amides, calcium stearate, zinc stearate and stearamide.

Preferably, the stearamide is selected from a group consisting of methylene bis stearamide and N,N'-ethylenebis stearamide.

Second, the present invention also relates to the preparation method of the easily-plated PC/ABS alloy, including the following steps of:

(a) blending the PC resin, ABS resin, PEO resin, antioxidant and lubricant in a mixer; and (b) putting the mixture from step (a) into a twin-screw extruder for granulation, thus producing easily-plated PC/ABS alloy particles.

Preferably, the temperature of the cylinder of the twin-screw extruder is 200-260° C., and the screw speed is 200-600 rpm.

Compared with existing technology, the present invention boasts the following advantages: the method is simple and practicable; PEO resin makes PC/ABS surface have the property of hydrophilicity, which makes the etching solution easier to wet the surface, so that the etching becomes much easier. The binding force of hydrophilic group on the surface of PEO to the metal is strong. The binding force of PC/ABS alloy material is improved due to the combination between the chemical bond and physical force.

The mechanism of action of the present invention: the PC resin synthesized through phosgenation and the ABS in proper ratio improve the impact property of material and reduce the influence on material property by the PEO hygroscopicity; by choosing proper molecular mass of PEO, the low hygroscopicity obviously lowers down the PC/ABS contact angle, and improves the surface hydrophilicity. The PEO hygroscopicity is able to lower down the PC/ABS surface contact angle, which can make the etching solution spread better and make etching easier; meanwhile, PEO resin surface contains a mass of hydroxyl groups which is able to well combine with metal coating, and improve the adhesion by the way of chemical bonds.

DETAILED DESCRIPTION OF THE PREFERRED EMBODIMENT

Below describes the present invention in detail with specific embodiments. The following embodiments will help those skilled in the art to further understand the present invention, but won't limit the present invention in any way. It should be noted that ordinary technicians not well skilled in the art, on the premise that they won't deviate from the inventive concept, can also make some transformations and improvements, and all of these belong to the scope of protection of the present invention.

Embodiment 1-4

Embodiment 1-4 relate to easily-plated PC/ABS alloy, the components of which are shown as table 1, where, the PC resin is PC1250WP from Japanese company TeiJin (the number average molecular mass is 22,000 g/mol, the glass transition temperature is 140° C.); the ABS resin is P/D190 from South Korea company KKPC (the number average molecular mass is 120,000 g/mol), of which the weight percentage of butadiene is 50%, the weight percentage of acrylonitrile is 15%, and the weight percentage of styrene is 35%; PEO resin is PEG-10000 from HONAM Petrochemical (the number average molecular mass is 10,000 g/mol); antioxidant is Irganox 1076 and Irganox 168 from Ciba company, with 1:1 weight ratio; lubricant is the pentaerythrite tetra-n-stearate sold in market.

TABLE 1

Components and Their Parts by Weight

| | Embodiment 1 | Embodiment 2 | Embodiment 3 | Embodiment 4 |
|---|---|---|---|---|
| PC | 60 | 30 | 50 | 50 |
| ABS | 15 | 55 | 40 | 42 |
| PEO | 5 | 5 | 10 | 8 |
| Antioxidant | 0.1 | 0.4 | 0.4 | 1 |
| Lubricant | 0.1 | 0.3 | 0.3 | 1 |

The preparation method as follows:

(a) blending the PC resin, ABS resin, PEO resin, antioxidant and lubricant in a mixer; and (b) putting the mixture from step (a) in a twin-screw extruder for granulation, thus producing easily-plated PC/ABS alloy particles; wherein a temperature of the cylinder of the twin-screw extruder is 200-260° C., and the screw speed is 200-600 rpm.

Embodiment 5

This embodiment relates to a kind of easily-plated PC/ABS alloy, the preparation method of which is as follows:

a. preparing the following components (in pbw):

| PC resin | 60, |
|---|---|
| ABS resin | 15, |
| PEO resin | 5, |
| antioxidant | 0.5, |
| lubricant | 0.5. | b. blending the PC resin, ABS resin, PEO resin, antioxidant and lubricant in a mixer; and c. putting the mixture in a twin-screw extruder for granulation, thus producing easily-plated PC/ABS alloy particles; wherein a temperature of the cylinder of the twin-screw extruder is 200-260° C., and the screw speed is 200-600 rpm.

The relative molecular mass of the PC resin is 17000 g/mol, the glass transition temperature is 140° C., and the PC resin is synthesized through phosgenation;

The ABS resin is graft copolymer composed of acrylonitrile-butadiene-styrene. The relative molecular mass is 100000 g/mol, of which the weight percentage of butadiene is 55%, the weight percentage of acrylonitrile is 15%, and the weight percentage of styrene is 30%;

The relative molecular mass of the PEO resin is 20000 g/mol;

The antioxidant is triethylene glycol bis [β-(3-tert-butyl-4-hytroxy-5-methylpheny) propionate];

The lubricant is N,N'-ethylenebis stearamide.

Embodiment 6

This embodiment relates to a kind of easily-plated PC/ABS alloy, the preparation method of which is the same with embodiment 5, and the difference is:

preparing the following components (in pbw):

| PC resin | 30, |
|---|---|
| ABS resin | 55, |
| PEO resin | 5, |
| antioxidant | 0.1, |
| lubricant | 0.1. |

The relative molecular mass of the PC resin is 30000 g/mol, the glass transition temperature is 150° C., and the PC resin is synthesized through phosgenation;

The ABS resin is graft copolymer composed of acrylonitrile-butadiene-styrene. The relative molecular mass is 180000 g/mol, of which the weight percentage of butadiene is 30%, the weight percentage of acrylonitrile is 15%, and the weight percentage of styrene is 55%;

The molecular mass of the PEO resin is 10000 g/mol;

The antioxidant is pentaerythrite tetra [β-(3,5-di-tert-butyl-4-hydroxyphenyl)-propionate] and tris (2,4-ditert-butylphenyl) phosphate;

The lubricant is the mixture of methylene bis stearamide and N,N'-ethylenebis stearamide.

Embodiment 7—Effect

Form the easily-plated PC/ABS alloy prepared in embodiments 1-6 into 140 mm*90 mm*3 mm high glossy boards through injection molding, and perform electroplating in a electroplating factory located in Shanghai. In etching solution, the concentrations of concentrated sulfuric acid and chromic acid both are 400 g/L, and the etching temperature is 68° C.

Test the contact angle in accordance with ISO 15989, the test liquid is second deionized water.

The adhesion test should be performed in accordance with GMW14668-2010, with stretching velocity 100 mm/min, angle 90°;

The notch impact strength test should be performed in accordance with ASTM D256, with temperature 23° C.

The test results are shown as table 2:

TABLE 2

Etching Time and Test Results of Embodiments 1-6

|  | Embodiment 1 | Embodiment 2 | Embodiment 3 | Embodiment 4 | Embodiment 5 | Embodiment 6 |
|---|---|---|---|---|---|---|
| Contact angle | 70.2 | 69.9 | 65.4 | 66.2 | 73.7 | 73.2 |
| Etching time | 11 | 13 | 11 | 13 | 13 | 13 |
| Adhesion (N/cm) | 4.5 | 11.3 | 9.8 | 9.7 | 4.6 | 6.8 |
| Notched Izod impact performance (J/m) | 550 | 350 | 650 | 660 | 350 | 200 |

According to table 2, the addition of PEO resin makes PC/ABS surface have the property of hydrophilicity, which makes the etching solution easier to wet the surface when under etching, so that the etching becomes much easier. The binding force of hydrophilic group on the surface of PEO to the metal is strong. The binding force of PC/ABS alloy material is improved due to the combination between the chemical bond and physical force.

CONTRASTING EXAMPLE 1

This contrasting example aims to research the influence of dosage of PEO resin on the property of this PC/ABS alloy; based on embodiment 3, this contrasting example respectively adjusts the parts by weight of PEO to 3, 4, 5, 10, 11, 12, and adopts the method from embodiment 7 to conduct property test of the prepared PC/ABS alloy. See table 3 for the test results:

TABLE 3

|  | Embodiment 3 | Contrasting example 1 (PEO dosage) | | | | | |
|---|---|---|---|---|---|---|---|
|  |  | 3 | 4 | 5 | 10 | 11 | 12 |
| Contact angle | 65.4 | 71.5 | 69.9 | 67.3 | 65.4 | 64.2 | 66.7 |
| Etching time | 11 | 13 | 13 | 13 | 11 | 13 | 13 |
| Adhesion (N/cm) | 9.8 | 4.2 | 4.5 | 8 | 9.8 | 8.2 | 6 |
| Notched Izod impact performance (J/m) | 650 | 780 | 760 | 750 | 650 | 350 | 280 |

According to table 3, the optimal content range of PEO resin is 5-10; when PEO content is lower than 5 or higher than 10, the adhesion declines. When PEO content is lower than 5, the influence on contact angle of PC/ABS alloy surface is small, and easy plating is not available; when PEO content is higher than 10, the strong hygroscopicity will greatly influence the material's physical property, which will lower down the impact performance.

CONTRASTING EXAMPLE 2

This contrasting example, based on contrasting example 1, further researches the influence of the relative molecular mass of PEO resin on the property of PC/ABS alloy; the components and preparation method of this contrasting example are the same with embodiment 3, while the difference is that the PEO resin is the combination of PEG-6000 (its number average molecular mass is 6,000 g/mol) and PEG-30000 (its number average molecular mass is 30,000 g/mol) from HONAM Petrochemical. Likewise, the method from embodiment 7 is adopted to conduct property test for the prepared PC/ABS alloy. See table 4 for the test results:

TABLE 4

|  | Embodiment 3 | Contrasting example 2 | |
|---|---|---|---|
|  |  | (PEG6000) | (PEG-30000) |
| Contact angle | 65.4 | 70 | 68 |
| Etching time | 11 | 13 | 13 |
| Adhesion (N/cm) | 9.8 | 4.0 | 3.2 |

According to table 4, the plating property of PC/ABS alloy of embodiment 3 is optimum; the reason is that the molecular mass of PEO is 10000-20000, which most obviously lowers down the PC/ABS contact angle, thus making PC/ABS alloy achieve the property of easy-plating.

CONTRASTING EXAMPLE 3

This contrasting example, based on contrasting examples 1 and 2, further researches the influence of the butadiene content of ABS resin on the property of PC/ABS alloy; based on embodiment 3, this contrasting example respectively adjusts the weight percentage of butadiene of ABS resin to 20%, 30%, 45%, 50%, 55%, 60%, and adopts the method from embodiment 7 to conduct property test of the prepared PC/ABS alloy. See table 5 for the test results:

TABLE 5

| | Embodiment 3 | Contrasting example 3 (butadiene of ABS wt %) | | | | | |
|---|---|---|---|---|---|---|---|
| | | 20% | 30% | 45% | 50% | 55% | 60% |
| Contact angle | 65.4 | 65.2 | 65.4 | 65.3 | 65.2 | 65.4 | 65.8 |
| Etching time | 11 | 11 | 11 | 11 | 11 | 11 | 11 |
| Adhesion (N/cm) | 9.8 | 3 | 6.8 | 7 | 9.3 | 9.8 | 6 |
| Notched Izod impact performance (J/m) | 650 | 230 | 350 | 550 | 620 | 650 | 680 |

According to table 5, when the butadiene content of ABS resin is 20%, the addition of PEO has a great influence on impact performance; 60% butadiene content is able to easily cause excessive etching, reducing the adhesion; in other words, the content range of butadiene of ABS resin of the present invention is 30-55%. Meanwhile, when the content range of butadiene of ABS resin is 45-55%, the impact performance of PC/ABS alloy is excellent.

CONTRASTING EXAMPLES 4, 5

Contrasting examples 4 and 5, based on contrasting examples 1, 2 and 3, further research the influence of the synergistic effect of PC resin and PEO resin on the property of PC/ABS alloy; based on embodiment 3, contrasting example 4 adjusts PC resin to be PC201-22 from South Korea LG-DOW (the number average molecular mass is 20,000 g/mol), with glass transition temperature 140° C., and this resin is prepared by ester exchange; the PC resin of contrasting example 5 is the same with embodiment 3, being PC resin synthesized through phosgenation, and the difference is that dosages of PC resin respectively are 20, 25, 65, 70. Likewise, the method from embodiment 7 is adopted to conduct property test of the prepared PC/ABS alloy. See table 6 for the test results:

TABLE 6

| | Embodiment 3 | Contrasting example 4 | Contrasting example 5 (PC dosage) | | | |
|---|---|---|---|---|---|---|
| | | | 20 | 25 | 65 | 70 |
| Contact angle | 65.4 | 65.4 | 64.2 | 64.4 | 66.2 | 68 |
| Etching time | 11 | 11 | 11 | 11 | 11 | 11 |
| Adhesion (N/cm) | 9.8 | 6 | 3 | 4 | 2 | 1.5 |

According to table 6, the thermostability of PC resin by non-phosgene in contrasting example 4 is worse than embodiment 3, which affects the adhesion of PC/ABS alloy. The plating property of PC/ABS alloy prepared in contrasting example 5 is much worse than embodiment 3. There is obvious skip plating when the PC parts by weight are more than 65. That means that there is a proper ratio among PC resin, PEO resin and other components, under which all components are able to play optimum synergistic effect, thus entirely improving the plating effect of PC/ABS alloy of the present invention.

In conclusion, the method of the present invention is simple and practicable, the synthesis of PC resin by phosgenation and the ABS in proper ratio improve the impact performance of material and reduce the influence on material property by the PEO hygroscopicity; by choosing proper molecular mass of PEO, the low hygroscopicity obviously lowers down the PC/ABS contact angle, and improves the surface hydrophilicity. The PEO hygroscopicity is able to lower down the PC/ABS surface contact angle, which is able to make the etching solution spread better and make etching easier; meanwhile, PEO resin surface contains a mass of hydroxyl groups which is able to well combine with metal plating, and preferably improve adhesion by the way of chemical bonds; the combination of two effects improves the plating effect of PC/ABS alloy material of the present invention.

Above describes the specific embodiments of the present invention. Note that the present invention is not limited to above-mentioned specific descriptions, and those skilled in the art can make various transformations or modifications within the claims, that wouldn't affect the substantive content of the present invention.

What is claimed is:
1. An easily-plated PC/ABS alloy, wherein comprising following components (in pbw):

| | |
|---|---|
| PC resin | 30-60, |
| ABS resin | 15-55, |
| PEO resin | 5-10, |
| antioxidant | 0.1-1, |
| lubricant | 0.1-1. |

2. The easily-plated PC/ABS alloy, as recited in claim 1, wherein the PC resin has a relative molecular mass of 17000-30000 g/mol, and a glass transition temperature of 140-150° C.

3. The easily-plated PC/ABS alloy, as recited in claim 1, wherein the PC resin is synthesized through phosgenation.

4. The easily-plated PC/ABS alloy, as recited in claim 1, wherein the ABS resin is graft copolymer composed of acrylonitrile-butadiene-styrene; a relative molecular mass of the ABS resin is 100000-180000 g/mol, of which a weight percentage of butadiene is 30-55%, a weight percentage of acrylonitrile is 15-32%, and a weight percentage of styrene is 30-60%.

5. The easily-plated PC/ABS alloy, as recited in claim 1, wherein a relative molecular mass of the PEO resin is 10000-20000.

6. The easily-plated PC/ABS alloy, as recited in claim 1, wherein the antioxidant is selected from a group consisting of triethylene glycol bis [β-(3-tert-butyl-4-hytroxy-5-methylpheny) propionate], pentaerythrite tetra [β-(3,5-di-tert-butyl-4-hydroxyphenyl)-propionate], tris (2,4-ditert-butylphenyl) phosphite, and distearyl pentaerythritol diphosphite.

7. The easily-plated PC/ABS alloy, as recited in claim 1, wherein the lubricant is selected from a group consisting of silylated polymer, solid paraffin, liquid paraffin, fatty acid salt, calcium stearate fatty acid amides, calcium stearate, zinc stearate and stearamide.

8. The easily-plated PC/ABS alloy, as recited in claim 7, wherein the stearamide is selected from a group consisting of methylene bis stearamide and N,N'-ethylenebis stearamide.

9. A preparation method of an easily-plated PC/ABS alloy, comprising following steps of:
(a) blending PC resin, ABS resin, PEO resin, antioxidant and lubricant in a mixer; and
(b) putting a mixture from the step (a) in a twin-screw extruder for granulation, so as to easily-plated PC/ABS alloy particles.

10. The preparation method, as recited in claim 9, wherein a temperature of a cylinder of the twin-screw extruder is 200-260° C., and a screw speed is 200-600 rpm.

\* \* \* \* \*